United States Patent [19]

Yamada et al.

[11] Patent Number: 5,412,422
[45] Date of Patent: May 2, 1995

[54] HIGH SPEED IMAGING APPARATUS

[75] Inventors: Shigeru Yamada, Osaka; Masataka Tsuji, Kobe; Kenji Mitsui, Yokohama, all of Japan

[73] Assignee: Kabushiki Kaisha Photron, Tokyo, Japan

[21] Appl. No.: 976,334

[22] Filed: Nov. 13, 1992

[30] Foreign Application Priority Data

Dec. 12, 1991 [JP] Japan .................................. 3-328940

[51] Int. Cl.⁶ ........................ H04N 5/45; H04N 5/232
[52] U.S. Cl. ..................................... 348/218; 348/304
[58] Field of Search ........................... 358/105, 213.27; 348/302, 304, 218, 61, 218, 169, 699; H04N 5/232

[56] References Cited

U.S. PATENT DOCUMENTS

| | | | |
|---|---|---|---|
| 3,885,090 | 5/1975 | Rosenbaum | 358/105 |
| 4,339,775 | 7/1982 | Lemke et al. | 360/10 |
| 5,146,340 | 9/1992 | Dickerson et al. | 358/213.27 |
| 5,153,731 | 10/1992 | Nagasaki et al. | 348/304 |

FOREIGN PATENT DOCUMENTS

| | | |
|---|---|---|
| 0178954 | 4/1986 | European Pat. Off. |
| 0265302 | 4/1988 | European Pat. Off. |
| 2113949 | 8/1983 | United Kingdom |

*Primary Examiner*—Howard W. Britton
*Assistant Examiner*—A. Au
*Attorney, Agent, or Firm*—Finnegan, Henderson, Farabow, Garrett & Dunner

[57] ABSTRACT

A high speed imaging apparatus comprises an imaging sensor composed of a multiplicity of photoelectric converting elements which are two-dimensionally arrayed, the imaging sensor being sectioned into a plurality of blocks by effecting predetermined splitting in a vertical row direction and in a horizontal column direction and the blocks including photoelectric converting element groups, vertical and horizontal scanning circuit capable of parallel-reading of the photoelectric converting element groups of the respective blocks in vertical and horizontal direction, and a drive circuit for driving the vertical and horizontal scanning circuit so as to sequentially selecting one or plurality of the blocks within said imaging sensor which are then read and scanned. The imaging apparatus may further comprise an operation sensor for detecting a moving direction of an object, a control unit for calculating the blocks to be selected and a reading order of the selected blocks in response to a signal from the operation sensor, and a block selection address generation circuit through which an output signal from the control unit is inputted to the drive circuit so as to sequentially change over the blocks of the imaging sensor in accordance with the moving direction of the object.

9 Claims, 6 Drawing Sheets

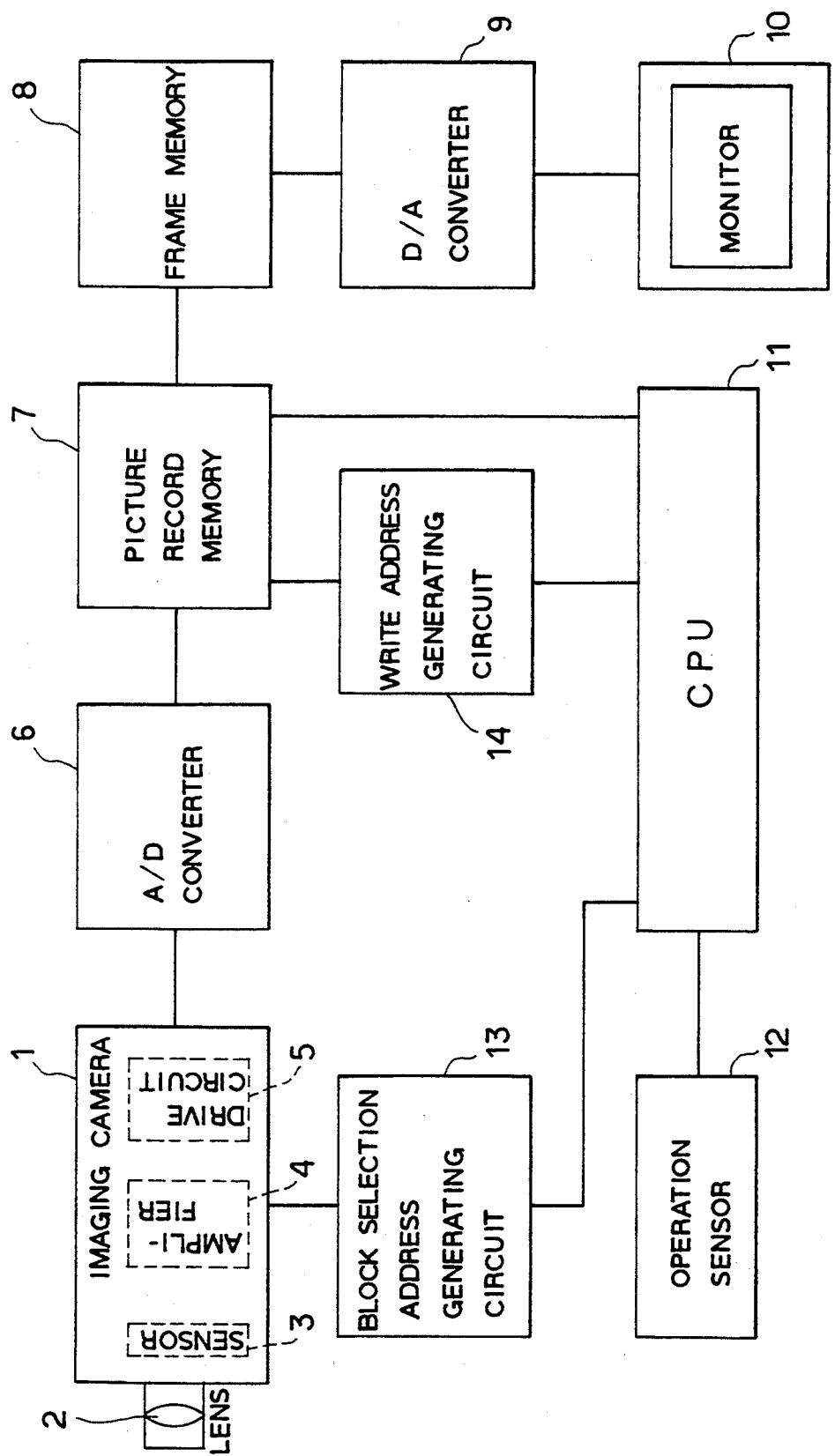
F I G. 1

HIGH SPEED IMAGING APPARATUS

BACKGROUND OF THE INVENTION

The present invention relates generally to a high speed imaging apparatus incorporated into a high speed video camera and a high speed video system and, more particularly, to a high speed imaging apparatus for imaging a moving picture at a high speed.

Some of high speed video cameras and high speed video systems incorporate a high speed imaging device for imaging a moving picture at a high speed. This high speed imaging device involves the use of, e.g., a solid-state imaging sensor as an imaging sensor for imaging a moving object. This solid-state imaging sensor is constructed to obtain a moving picture by sequentially making a 1-frame still picture continuous which is defined as a minimum unit for imaging.

The solid-state image sensor is arranged such that a multiplicity of photoelectric converting elements such as photo diodes are two-dimensionally arrayed to form an imaging surface, and a frame picture (still picture) is obtained by sequentially scanning the respective photoelectric converting elements combined to form this imaging surface by a predetermined scan method.

Where the photoelectric converting elements of, e.g., vertical 100 pixels×horizontal 100 pixels are two-dimensionally arrayed as the solid-state image sensor, 100-pixel line scanning is at first effected with respect to the first row in the vertical direction along a horizontal scan line. Upon an end of this line scanning, the line scanning along the second row is performed. Thereafter, this line scanning is sequentially executed. Upon a completion of the line scanning with respect to the 100th row, it follows that 1-frame imaging is completed.

Imaging is effected at a rate of 30 frames per second in ordinary television imaging. Hence, 3000 line scanning processes are executed for one second in the solid-state image sensor including the photoelectric converting elements in which 100 pixels are arrayed vertically and horizontally. Output signals associated with the line scanning are temporarily recorded in a VTR or a semiconductor memory, and thereafter scanning is effected at the same rate by a receiving CRT monitor, whereby a picture is reproduced and displayed.

A moving object moving at a high speed is imaged at a higher imaging rate than in the reproduction and reproduced at a normal rate of 30 frames per second. It is possible to see a motion of the moving object at a magnification given by 30 frames/imaging rate with a reduction in speed. This high speed imaging is applied to fields of physical science and engineering and sports as well. A variety of effects are exhibited.

In the television technology, a high speed imaging process is attained by increasing both the system frequency with some sacrifice of picture quality and the imaging rate. Alternatively, the high speed imaging process is attained by increasing a tape feeding speed of VTR and the number of revolutions of a video head. However, these high speed imaging methods are subject to technological restraints in terms of circuitry and mechanical aspects, wherein approximately 1000 frames per second are the limited level.

The following is a method for actualizing the high speed imaging. The imaging rate is increased by reducing the number of photoelectric converting elements provided in a solid-state image sensor and the number of vertical and horizontal pixels. According to this high speed imaging method, a high speed imaging process as high as 5000 frames per second is attainable. This method, however, presents such a defect that the screen size is diminished in inverse proportion to the imaging rate.

Proposed further is a high speed imaging method for actualizing the high speed imaging, wherein the multiplicity of photoelectric converting elements which are two-dimensionally arrayed in the solid-state image sensor are sectioned into a plurality of blocks, and the respective blocks are subjected to line scanning in parallel in the horizontal direction. According to this high speed imaging method, the imaging process as high as approximately 5000 frames per second is attainable without diminishing the screen. However, because of the respective blocks undergoing the line scanning in parallel, a plurality of amplifier circuits are simultaneously required. The circuitry becomes complicated and expensive.

The conventional high speed imaging device selects either the arrangement that a relatively high speed imaging operation is acquired by increasing the system frequency or the arrangement that the imaging speed is increased with sacrifices of the screen size and picture quality. Parallel imaging and parallel processing are needed for pursuits for increasing the imaging speed, keeping the screen size and improving the picture quality. The high speed imaging device becomes intricate and expensive.

SUMMARY OF THE INVENTION

It is an object of the present invention to substantially eliminate defects or drawbacks encountered in the prior art and to provide a high speed imaging apparatus capable of imaging a moving picture at a high speed and obtaining a high quality picture even by the high speed imaging operation without requiring the expensive parallel imaging and parallel processing.

It is another object of the present invention to provide a high speed imaging apparatus capable of the high speed imaging operation without increasing the system frequency and sacrificing the screen size and the picture quality.

These and other objects can be achieved according to the present invention by providing a high speed imaging apparatus comprising:

an imaging sensor composed of a multiplicity of photoelectric converting elements which are two-dimensionally arrayed, the imaging sensor being sectioned into a plurality of blocks by effecting predetermined splitting in a vertical row direction and in a horizontal column direction, the blocks including photoelectric converting element groups;

vertical and horizontal scanning circuit means capable of parallel-reading of the photoelectric converting element groups of the respective blocks in vertical and horizontal directions; and drive circuit means for driving the vertical and horizontal scanning circuit means so as to sequentially selecting one or plurality of the blocks within the imaging sensor which are then read and scanned.

In a preferred embodiment, the high speed imaging apparatus further comprises an operation sensor for detecting a moving direction of an object, control means for calculating the blocks to be selected and a reading order of the selected blocks in response to a signal from the operation sensor, and a block selection address generation circuit through which an output signal from the control means is inputted to the drive circuit means so as to sequentially change over the blocks of the imaging sensor in accordance with the moving direction of the object. The imaging apparatus further comprises an amplifying circuit operatively connected to the imaging sensor, an analog-to-digital converter connected to the amplifying circuit and a picture image record memory connected to the analog-to-digital converter for recording and storing an image data on pictures imaged by the imaging sensor, wherein a part of the still picture stored in the picture record memory is replaced with a block picture in which a picture variation is caused.

In this high speed imaging apparatus for attaining the high speed imaging operation, scanning of the imaging sensor is executed limitedly in a variation-caused area in the moving direction of the object.

In the system for imaging the picture by scanning of the imaging sensor, if a local imaging process can be selectively performed by selecting only a portion in which the variation is caused, the scanning time may be smaller than in the case where the whole frames including the still portions are imaged. The imaging process can be executed at a higher speed, correspondingly.

In the moving picture, all the frames are not necessarily moved, and there is less possibility where the attention is paid to the entire screen.

Selected in this high speed imaging apparatus is the object moving portion, i.e., the block area only in the vicinity of the portion to which the attention is paid. The image data is outputted from only that block area, and instead, scanning (signal processing) of unnecessary portions is not performed. With this arrangement, the object moving portion is locally scanned in concentration. The imaging speed is increased by incrementing the number of the scanning processes.

It may be therefore sufficient in this high speed imaging apparatus that parallel processing only in the blocks within the imaging sensor is carried out. There is no necessity for performing parallel processing and parallel imaging of the entire frames on the large scale at the high costs as in the case of the conventional apparatuses. The moving picture is imaged at the high speed, and the high quality picture can be obtained even by the high speed imaging operation.

The nature and further features of the present invention will be described hereunder with reference to the accompanying drawings.

BRIEF DESCRIPTION OF THE DRAWINGS

In the accompanying drawings:

FIG. 1 is a functional block diagram showing an example where a high speed imaging apparatus of the present invention is applied to a high speed video system;

DESCRIPTION OF THE PREFERRED EMBODIMENTS

Figure 2:
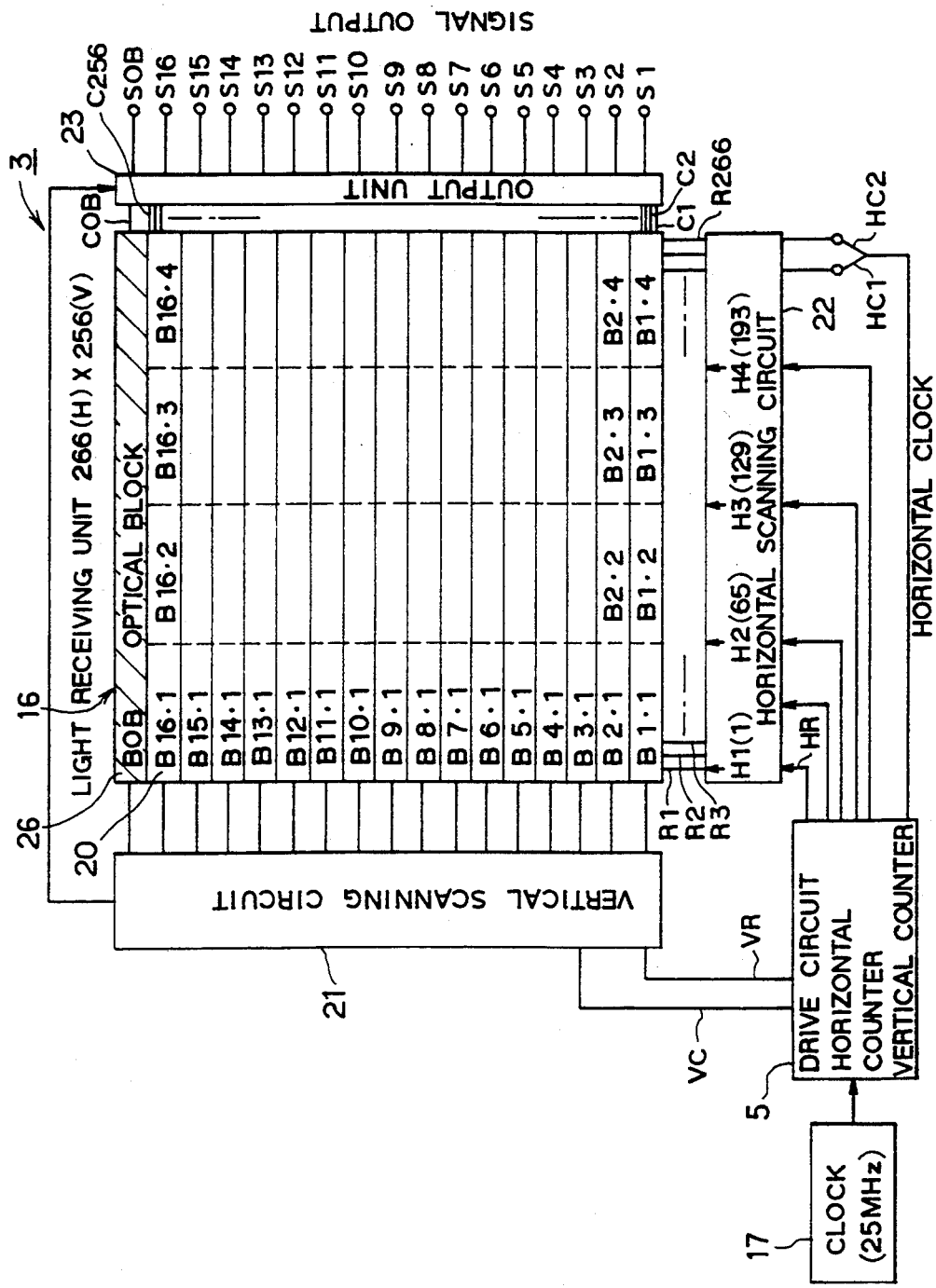
FIG. 2 is a view showing one embodiment of the high speed imaging apparatus of the present invention.

One embodiment of a high speed imaging apparatus according to the present invention will hereinafter be described with reference to the accompanying drawings.

FIG. 1 is a functional block diagram showing an example where the high speed imaging apparatus of the present invention is applied to a high speed video system. This high speed video system includes an imaging camera 1 capable of imaging a moving object at a high speed. This imaging camera 1 incorporates an imaging sensor 3 for imaging the moving object through an objective optical system 2, an amplifier group 4 for amplifying output video signals from the imaging sensor and a drive circuit 5 for driving the imaging sensor 3.

For example, 16 pieces of analog video signals are outputted from the imaging camera 1 after being amplified by the amplifier group 4. The outputted analog video signals are converted into digital video signals by means of an A/D converter 6 and consecutively inputted to a picture record memory 7. The picture record memory 7 continuously inputs the 16-channel digital video signals and stores the signals as picture digital data.

The picture digital data stored in the picture record memory 7 are read in time series by a frame memory 8. Frame pictures are reproduced as continuous pictures at a lower speed than the imaging speed and then reconstructed. The digital data signals of the frame pictures are converted into analog data signals by a D/A converter and inputted to a picture monitor 10. The picture is displayed on this picture monitor 10.

The operations of the whole high speed video system and of respective parts are controlled by a control unit 11 such as a microcomputer or a central processing unit (CPU). Sensor signals are inputted from operation sensors 12 to this control unit 11. Upon inputting the sensor signals, the control unit 11 performs a block selection control of the imaging sensor 3 built in the imaging camera 1 and a control to make the frame memory 8 effect the reconstruction by reading from the picture record memory 7 in addition to the control over the whole system. In particular, the control unit 11 selects a point sensor, a line sensor and a surface sensor which are defined as the operation sensors 12 in accordance with a motion, a configuration and a size of the object. An output block of the imaging sensor 3, which will be mentioned later, is selected through a block selection address generating circuit 13 in accordance with the inputs from the operation sensors 12.

Note that the imaging sensor 3 may be provided with a function to select the output block of the imaging sensor 3. In this case, the operation sensors are unnecessary. Besides, two or more couples of line sensors may be combined in place of the surface sensor.

Designated at 14 is a write address generating circuit for writing the data necessary for the picture record memory 7. This address generating circuit 14 generates a write address to the picture record memory 7 at a high speed. Note that the picture digital data are read from the picture record memory 7 at a relatively low speed.

Further, the reading order is not constant, and hence, as explained above, the control unit like the CPU generates the read address.

As shown in FIG. 2, the imaging sensor 3 incorporated into the imaging camera 1 consists of a solid-state imaging element 16. This solid-state image sensor 16 is driven by a drive signal from the drive circuit 5, and reading is thereby started. The drive circuit 5 is driven by clock pulses from a clock 17 having a predetermined frequency, e.g., 25 MHz.

The solid-state image sensor 16 includes an imaging surface, i.e. light receiving surface, 20 configured by a two-dimensionally array of photoelectric converting elements such as photo diodes or the like which are composed of MOS type semiconductor elements.

Imaging sensor 3 further includes a vertical scanning circuit 21 as a first scanning circuit constituting a vertical column block selection shift register, a horizontal scanning circuit 22 as a second scanning circuit constituting a horizontal row block selection shift register and row shift register, and an output unit 23 for outputting multi-channel analog video signals $S_1$–$S_{16}$ by scanning the imaging surface.

In the solid-state image sensor 16, the formatted imaging surface 20 is formed in such a way that the photoelectric converting elements 25 constituting the pixels are two-dimensionally arrayed in, e.g., 266 horizontally disposed elements $R_1, R_2 \ldots R_{266}$ in each of 256 horizontal rows $C_1, C_2, \ldots C_{256}$. The imaging surface 20 may be sectioned into blocks, e.g., 16 blocks in the vertical direction and, e.g., 4 blocks in the horizontal direction for a total of 64 blocks ($B_{1.1}, B_{2.1}, \ldots B_{16.1}, B_{1.2}, B_{16.2}, B_{1.3}, \ldots B_{16.3}, B_{1.4}, \ldots B_{16.4}$).

Each of the sectioned blocks $B_{1.n}, B_{2.n}, \ldots B_{16.n}$ (where, n=1 to 4) is formed of a plurality of horizontal rows, e.g., 16 rows of photoelectric converting elements. Sixteen (16 rows) of scanning lines are formed of the respective photoelectric converting element columns. Sixteen (16 rows) scanning lines are respectively sequentially scanned in parallel by the vertical and horizontal scanning circuits for each of the blocks $B_{1.n}, B_{2.n}, \ldots B_{15.n}$, thereby outputting analog video signals $S_1, S_2, \ldots S_{16}$ from the output unit. Among the two-dimensionally arrayed photoelectric converting elements 25 of the imaging surface 20, the number of the photoelectric converting elements in the horizontal direction is greater by 10 than the number of photoelectric converting elements in the vertical direction. This intended to provide an allowance with respect to noises.

The imaging surface 20 is, as described above, sectioned into 4 blocks in the scanning line direction. The imaging surface 20 has line scanning start points $H_1$ (1st pixel), $H_2$ (65th pixel), $H_3$ (129th pixel) and $H_4$ (193th pixel) corresponding to the respective blocks.

Note that in FIG. 2, the numeral 26 represents an optical block $B_{OB}$ for setting a reference point of the A/D converter 6.

Further, horizontal clock pulses $HC_1, HC_2$ outputted from the drive circuit 5 and inputted to the horizontal scanning circuit 22 are used as timings for reading the pixels one by one when reading some pixels of the 266 photoelectric converting elements in the horizontal direction. When starting the horizontal reading process by any of horizontal shift register synchronous pulses $H_1, H_2, \ldots H_4$, the pixels are read by the horizontal clock pulses $HC_1, HC_2$ from this starting point. The clock pulses $HC_1, HC_2$ are out of phase 180° at, e.g., 12.5 MHz, and a horizontal scanning speed is 25 MHz.

Figure 3:
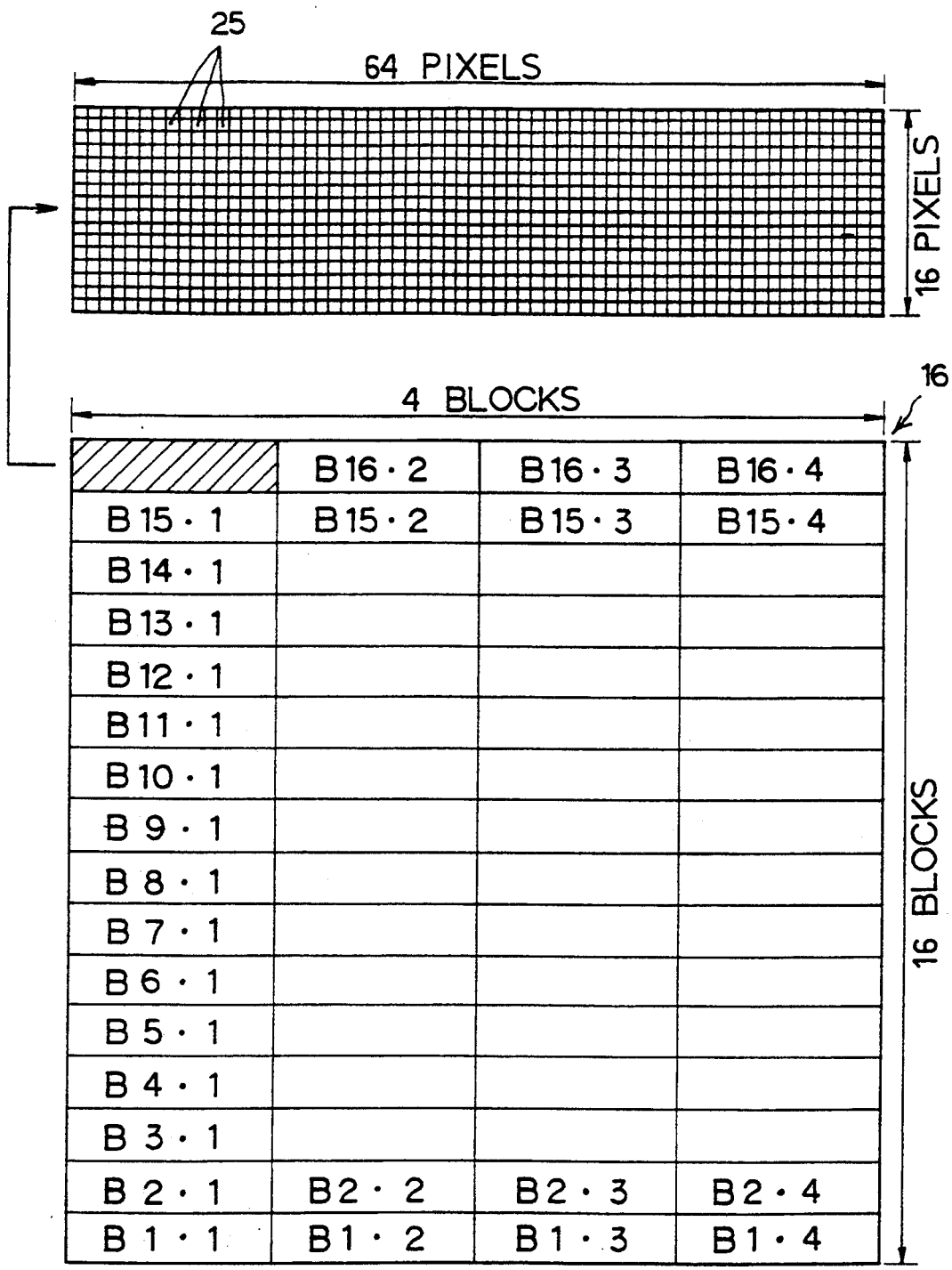
FIG. 3 is a diagram illustrating an example of placement of photoelectric converting elements in a metal oxide semiconductor (MOS) type imaging sensor incorporated into the high speed imaging apparatus.

The photoelectric converting elements 25 are, as illustrated in FIG. 3, arrayed into blocks of the solid-state image sensor 16. Each block includes 16 (rows) horizontal scanning lines and is capable of providing parallel output signals.

Figure 4:
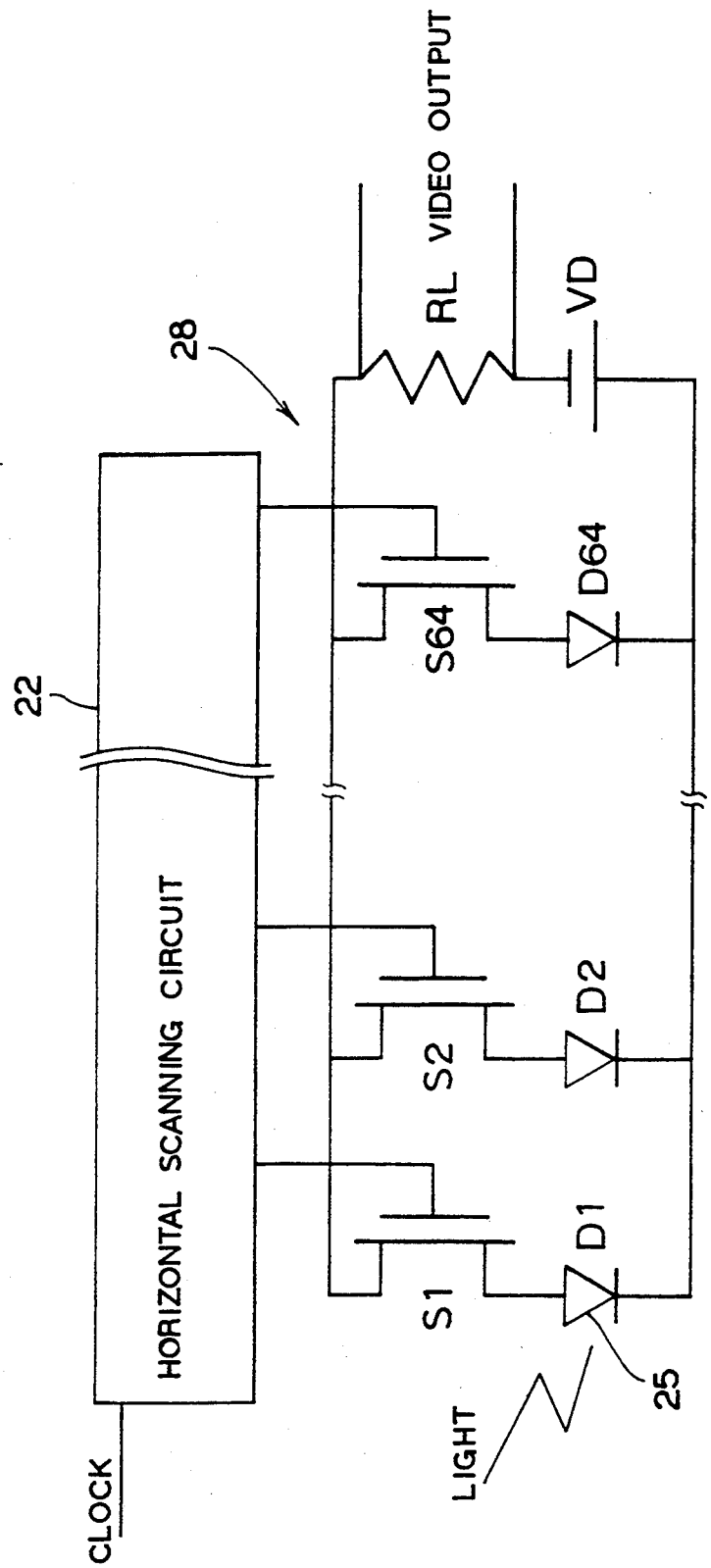
FIG. 4 is a diagram illustrating a scanning circuit in one column within one block of the imaging sensor shown in FIG. 3.

An electric scanning circuit 28 for one horizontal row within one block of the solid-state image sensor 16 is constructed as shown in FIG. 4. The scanning circuit 28 includes 64 photo diodes $D_1, D_2 \ldots D_n$ arranged as the photoelectric converting elements 25 for converting intensities of the incident light into electric signals. The photo diodes are connected to MOS type field effect transistor (FET) switches $S_1, S_2, \ldots S_n$. Gates of the FET switches $S_1, S_2, \ldots S_n$ are connected to the horizontal scanning circuit 22. Trigger signals synchronizing with outside clocks from this horizontal scanning circuit 22 are sequentially transmitted to the FET switches $S_1, S_2, \ldots S_n$, thereby sequentially turning ON the respective switches $S_1, S_2, \ldots S_n$. Drains of all the MOS type FET switches are connected in parallel to a load resistor RL and a power supply VD.

When the FET switches $S_1, S_2, \ldots S_n$ are opened once, electric charges are supplied to capacitors of the photo diodes $D_1, D_2, \ldots D_n$ until they reach saturation, because PN junctions of the photo diodes $D_1, D_2, \ldots D_n$ undergo reverse biasing. When the light is incident on the photo diodes $D_1, D_2, \ldots D_n$, electrons and holes are excited by the incident light, whereby a discharge current flows to the photo diodes $D_1, D_2, \ldots D_n$. The discharge current is proportional to an amount of light incident during one scanning period of the horizontal scanning circuit 22.

When the FET switches $S_1, S_2, \ldots S_n$ are opened by the horizontal scanning circuit 22 during a next scanning period, the power supply VD supplies a charge current for compensating for the discharge current discharged by the incident light. The charge current is proportional to the incident light quantity and is therefore outputted as an output video signal. For each block of imaging surface 20 there are preferably 16 electric scanning circuits 28 depicted in FIG. 4.

Next, an outline of the operation of the high speed video system will be described.

In this high speed video system, the object is imaged by the imaging sensor 3 through the objective optical system (lens system) of a camera by manipulating the imaging camera 1 depicted in FIG. 1. The same object may also be imaged on a relatively large screen of the operation sensor 12 through a lens of a system (not shown) separated from the objective optical system.

The operation sensor 12 outputs a sensor signal identifying a moving portion of the object to the control unit 11. The control unit 11 analyzes this sensor signal and calculates the reading order of selected blocks of the imaging sensor 3 and also changeover timings. The control unit 11 gives an indication to the block selection address generating circuit 13.

The block selection address generating circuit 13 sequentially selects the blocks to be outputted by the imaging sensor 3 through the drive circuit 5 which will be mentioned later and gives an indication. The block selection address generating circuit 13 may serve as a drive circuit.

If the direction in which the subject is moving is known beforehand, specifying the block selection, i.e. reading, of the imaging sensor 3 can be also effected manually.

Sixteen horizontal rows of photoelectric converting elements 25 are simultaneously read within one imaging block of the imaging sensor 3 which has received the reading indication.

Parallel analog video signals outputted from the imaging camera 1 are converted into digital video signals by the A/D converter 6. The video signals are sequentially recorded in the picture record memory 7. Recording positions thereof are, however, specified by a picture memory write address generating circuit 14 controlled by the control unit 11. The picture record memory 7 is capable of recording after being partially reset but is also capable of partially modifying some records on the previous screen. In the partial modification on the previous screen, only a part of the still picture stored in the picture record memory 7 is replaced with a variation-caused block picture outputted from the imaging camera 1. Excepting the replaced block picture on the previous screen is adopted to form one frame picture.

The picture recorded in the picture record memory 7 is conceived as a block picture. Hence, during a picture reproducing process, the block picture data are transferred to a frame memory 8 in such a sequence as to obtain the frame picture in accordance with the indication from the control unit 11. Reproduced picture signals are converted into analog video signals by the D/A converter 9 and displayed on a video (television) monitor 10.

The following is an explanation of reading of the picture recorded on the imaging surface 20 of the solid-state image sensor 16 by means of the imaging camera 1.

To start with, the entire imaging surface 20 of the solid-state image sensor 16 is scanned. As illustrated in FIG. 2, the vertical scanning circuit 21 receives a vertical shift register clock pulse VC and a vertical reset pulse VR as drive signals from the drive circuit 5, which is driven by the clock 17. The vertical scanning circuit 21 is reset by the vertical reset pulse VR and selects the first block $B_{1.n}$ by the vertical shift register clock pulse VC. The picture scanning operation of the first block $B_{1.n}$ is thereby attainable.

Further, a horizontal reset pulse HR and a horizontal shift register synchronous pulse $H_1$ (the first pixel start) are transmitted to the horizontal scanning circuit 22 from the drive circuit 5. The horizontal scanning circuit 22 is set by the horizontal reset pulse HR, and scanning sequentially started from the first pixel $R_1$ by the horizontal shift register synchronous pulse $H_1$.

With this operation, the picture recorded on the imaging surface 20 of the solid-state image sensor 16 is scanned in parallel simultaneously along the 16 (rows) scanning lines from the first pixel $R_1$ of the selected first block $B_{1.n}$. Analog video signals $S_1, S_2, \ldots S_{16}$ obtained by this scanning are outputted from the output unit 23.

The drive circuit 5 is provided with a horizontal counter. Just when horizontally scanning the 256 pixels, the horizontal reset pulse HR is transmitted to the horizontal scanning circuit 22 to temporarily stop the horizontal scan. Next, the vertical shift register clock pulse VC is transmitted to the vertical scanning circuit 21 to finish making the first block $B_{1.n}$ operable. Skipping in the vertical direction is effected, and the second block $B_{2.n}$ is selected, thus making the second block $B_{2.n}$ operable.

Thereafter, the first pixel start horizontal shift register synchronous pulse $H_1$ is transmitted to the horizontal scanning circuit 22 from the drive circuit 5, thereby starting the read of the second block $B_{2.n}$.

Subsequently, the reading processes of the respective blocks $B_{3.n}$–$B_{16.n}$ are sequentially performed by consecutively repeating the above-described operations. After finishing the read of the last block $B_{16.n}$, the vertical reset pulse VR and the vertical shift register clock pulse VC are transmitted from the drive circuit 5 to the vertical scanning circuit 21. Preparatory to image processing of the next imaging surface 20, the first block $B_{1.n}$ is reselected and is thereby operable.

The output unit of the solid-state image sensor 16 outputs, to the A/D converter 6, the 16-scanning-line analog video signals $S_1, S_2, \ldots S_{16}$ corresponding to the operable selected blocks $B_{1.n}, B_{2.n}, \ldots B_{16.n}$. Although the inoperable non-selected blocks are not subject to image scanning they accumulate the electric charges corresponding to the incident light.

Next, a description will be given to a case where scanning (image processing) is performed after selecting an imaging area from the imaging surface 20 of the solid-state image sensor 16.

Exemplified is a case of reading rectangular portions of blocks $B_{7.3}, B_{8.3}$ as imaging areas.

A control signal is transmitted from the block selection address generating circuit 13 to the drive circuit 5 driven by the clock 17. The vertical reset pulse VR is transmitted to the vertical scanning circuit 21 as a drive signal from the drive circuit 5. The vertical scanning circuit 21 is reset by this vertical reset pulse VR. Next, the vertical shift register clock pulses VC are transmitted continuously for 7 clocks to the vertical scanning circuit 21 from the drive circuit 5. A seventh block $B_{7.n}$ is thereby selected, and the operation on the selected seventh block $B_{7.n}$ is thereby possible.

In a state where the seventh block $B_{7.n}$ is made operable, the horizontal reset pulse HR and the horizontal shift register synchronous pulse $H_3$ for starting the 129th pixel are transmitted to the horizontal scanning circuit 22 from the drive circuit 5 as drive (address) signals. The horizontal scanning circuit 22 is reset by the horizontal reset pulse HR, and scanning is started from the 129th pixel by the horizontal shift register synchronous pulse $H_3$.

Figure 5:
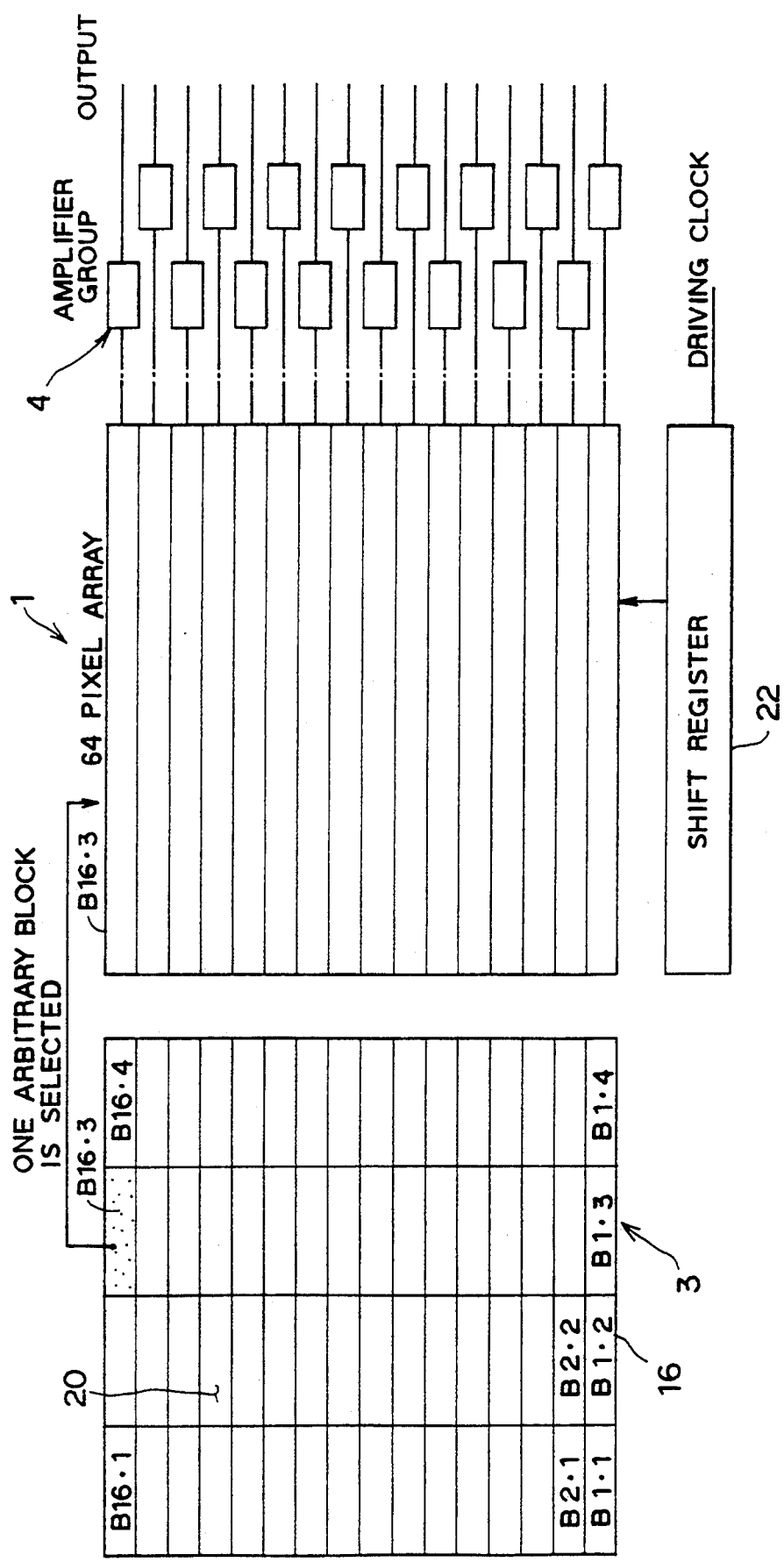
FIG. 5 is a block circuit diagram of an imaging camera constituting the high speed imaging device of this invention.

Upon a start of scanning after selecting the block $B_{7.3}$, 16 video signals are simultaneously read 64 times (corresponding to the number of pixels of one block in the scanning direction). The thus read video signals are, as illustrated in FIG. 5, amplified by the amplifier group 4 and thereafter outputted as 16 parallel analog video signals from the imaging camera 1.

Horizontal scanning by the horizontal scanning circuit 22 is combined with the drive circuit 5, and counting is effected by the horizontal counter. Just when performing horizontal scanning for 64 pixels, the drive circuit 5 transmits the horizontal reset pulse HR to the horizontal scanning circuit 22 while taking a timing, and horizontal scanning is stopped to reset the circuit. On the other hand, the drive circuit transmits the vertical shift register clock pulse VC to the vertical scanning circuit 21. The operable state of the block $B_{7.n}$ is ended, and skipping is then performed to select the next block $B_{8.n}$. The 8th block $B_{8.n}$ is made operable.

Thereafter, the horizontal shift register synchronous pulse (the 129th pixel start) $H_3$ is transmitted to the horizontal scanning circuit 22 to select the block $B_{8.3}$. When the block $B_{8.3}$ is selected, this block is scanned by the same method with the block B$_{7,3}$. Sixteen analog video signals are outputted from the imaging camera 1.

Just when the reading of this block B$_{8,3}$ is ended, preparatory to reading of the next imaging area, the vertical reset pulse VR and the vertical shift register clock pulse VC continuing for 7 clocks are transmitted to the vertical scanning circuit 21. Scanning of the next block B$_{7,n}$ is started.

The block as an imaging area is selectable a given number of times corresponding to the number of combinations of the horizontal shift register synchronous pulses H$_1$, H$_2$, H$_3$, H$_4$, depending on the way of continuously imparting the vertical shift register clock pulse VC from the drive circuit 5. As imaging areas, one or more arbitrary blocks, i.e. areas, are selectable, thereby improving a degree of selective freedom of the imaging area.

The drive circuit 5 includes the horizontal and vertical counters and sets the entire screens, the starting points of the horizontal pixels of the imaging areas, i.e. split screen, the number of horizontal pixels, the starting points of the vertical blocks B$_{1,n}$–B$_{16,n}$ and the number of blocks.

However, upon a completion of outputting of one block, the next block is selected and similarly outputted. Each block can be selected at random in some cases or selected with an orientation in a given direction.

The sequential 64 reading processes in the scanning direction, i.e., in the horizontal direction can be finished in the course of reading thereof. If a request for reading other blocks arises in the course of reading a certain block, other blocks are immediately readable.

High speed imaging by this imaging camera 1 involves a variety of imaging methods depending on the selection of the respective blocks of the solid-state image sensor 16 defined as the imaging sensor 3.

The first imaging method is that the imaging order of the solid-state image sensor 16 is set beforehand, and imaging is effected by changing over the imaging blocks in accordance with the set order during the imaging operation.

Figure 6:
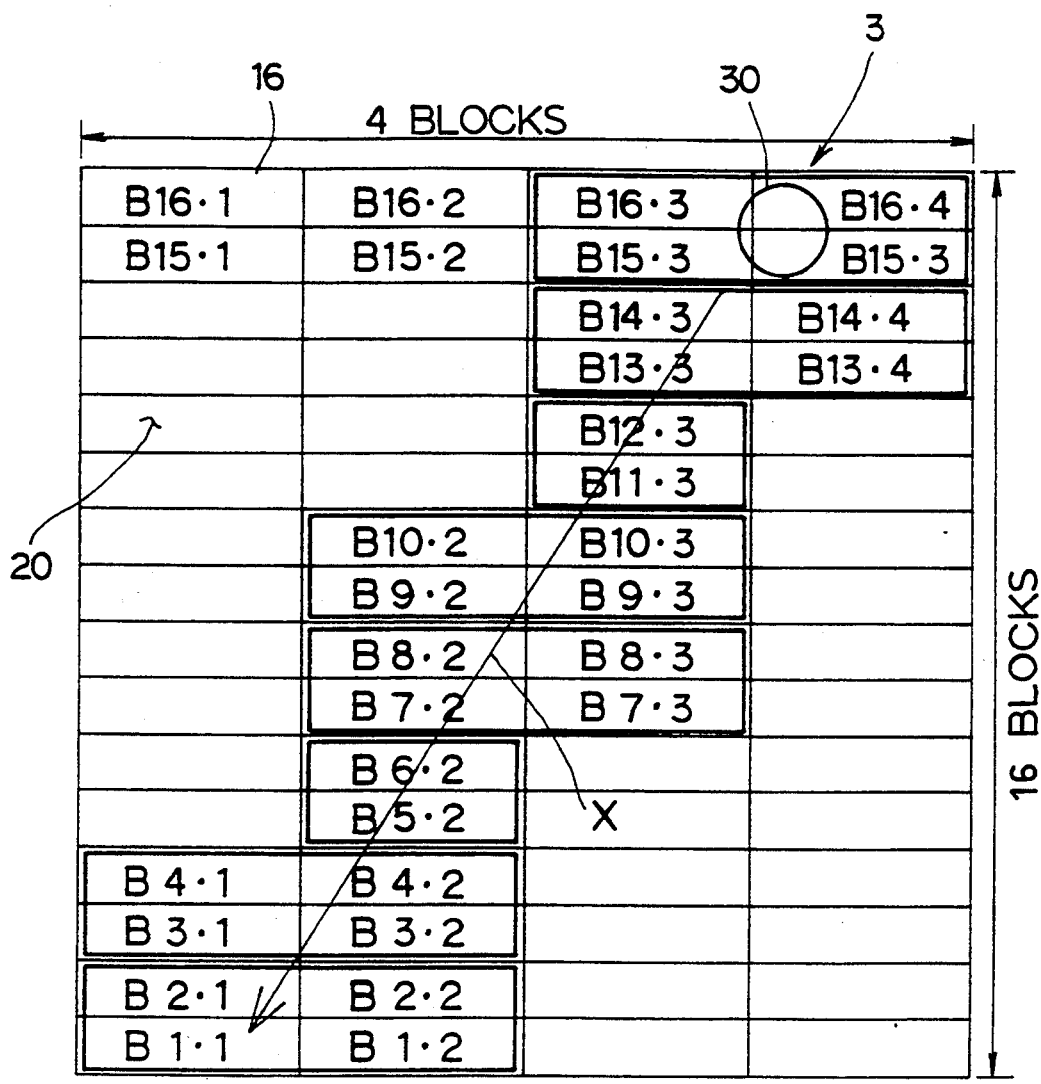
FIG. 6 is a diagram showing an example of selecting respective imaging blocks of the imaging sensor.

Based on this method, as depicted in FIG. 6, supposing that a circular object 30 disposed in an upper right position moves in an arrowed direction X, programming is executed to effect changeovers sequentially from the right upper part towards the left lower part as shown by rectangular frames surrounding the imaging blocks B$_{15,3}$, B$_{15,4}$, B$_{16,3}$, B$_{16,4}$ of the solid-state image sensor 16 because of the moving direction of the object 30 being predicted beforehand.

For omitting the explanation, FIG. 6 shows the respective imaging blocks selected at odd-numbered timings among the changeover timings of the imaging blocks, wherein the selections of the respective imaging blocks at the odd-numbered timings are omitted.

In this case, when starting the imaging operation by the imaging camera 1, the imaging blocks are sequentially changed over as indicated by the program, and hence there is no futile imaging block scanning. It is therefore possible to increase the imaging speed.

Although the embodiment of the present invention has been described using an example where the block of the solid-state image sensor consists of (16×64) photoelectric converting elements which are two-dimensionally arrayed, The present invention is not, however, necessarily limited to the physical block of (16×64) photoelectric converting elements. Blocks obtained by combining an arbitrary number of photoelectric converting elements are also usable. Further, a complex block obtained by combining the respective blocks may be available.

The embodiment of the present invention has presented an example where the photoelectric converting element groups incorporated into the respective blocks of the imaging sensor are read and scanned in the horizontal direction. However, the element group may be also read for scanning in the vertical direction.

As discussed above, in the high speed imaging apparatus according to the present invention, the imaging sensor having a multiplicity of two-dimensionally arrayed photoelectric converting elements is sectioned into a plurality of blocks by effecting the predetermined splitting in the vertical direction and in the horizontal direction. On the other hand, when the vertical and horizontal scanning circuits driven by the drive circuit scan the imaging sensor, the drive circuit sequentially selects one or a plurality of blocks within the imaging sensor, and then scanning is executed. Therefore, the necessity for scanning all the blocks of the imaging sensor is eliminated, and imaging can be performed quickly.

Further, in this high speed imaging device, the operation sensor detects the direction in which the object is moving. The blocks of the imaging sensor are selected in accordance with the detected direction in which the object is moving. The selected block reading order and the changeover timings thereof are obtained, and hence the scan of the imaging sensor can be performed limitedly in the object kinetic changing area. The unnecessary portions are not scanned. This leads to an improvement of the imaging speed.

Further, in this high speed imaging device, the still picture imaged by the imaging sensor is stored in the picture record memory. Only a part of the picture stored in this picture record memory is replaced with a block picture in which a picture variation is caused. Hence, even when effecting high speed imaging, there is no possibility in which the picture quality declines, and the screen size is reduced. A picture exhibiting a high accuracy and high quality can be obtained.

It is to be noted that the present invention is not limited to the described embodiments and many other changes or modifications may be made without departing from the scope of the appended claims.

What is claimed is:

1. A high speed imaging apparatus comprising:
    an imaging sensor composed of a two-dimensional array of photoelectric converting elements arranged in horizontal rows and vertical columns;
    defining means for dividing the imaging sensor into defined blocks of the photoelectric converting elements within the two-dimensional array by designating a horizontal block definition address including a starting row and an ending row, and vertical block definition address including a starting column and an ending column for each of the defined blocks;
    selecting means for selecting one of the defined blocks;
    horizontal scanning means for activating columns of the photoelectric converting elements within the selected one of the defined blocks;
    vertical scanning means for activating rows of the photoelectric converting elements within the selected one of the defined blocks; and reading means for reading parallel outputs from the photoelectric converting elements within activated columns of activated rows, wherein, after the photoelectric converting elements forming the selected one of the defined blocks have been read, said selecting means performs one of the functions of (1) reselecting the selected one of the defined blocks and (2) selecting a subsequent one of the defined blocks.

2. A high speed imaging apparatus according to claim 1, further comprising:

an operation sensor for detecting a direction in which an object to be imaged is moving; and control means for determining which of the defined blocks is to be selected by said selecting means and for determining an order in which the defined blocks are to be selected, in response to a signal from the operation sensor, wherein said selecting means includes a block selection address generation circuit for receiving an output signal from said control means and for sequentially supplying vertical block definition addresses of the defined blocks to be selected to said vertical scanning means and horizontal block definition addresses of the defined blocks to be selected to said horizontal scanning means in response to the output signal from said control means.

3. A high speed imaging apparatus according to claim 2, wherein said control means is a central processing unit.

4. A high speed imaging apparatus according to claim 2, wherein said control means controls said defining means to define and redefine blocks of the photoelectric converting elements in response to the signal from the operation sensor.

5. A high speed imaging apparatus according to claim 1, further comprising:

an amplifying circuit operatively connected to said imaging sensor;

an analog-to-digital converter connected to the amplifying circuit; and a picture image record memory, connected to the analog-to-digital converter, for recording and storing image data representing a field of view imaged by said imaging sensor, wherein a part of said field of view stored in said picture record memory in which a picture variation has subsequently occurred, is replaced with a block portion of a subsequently imaged field of view corresponding to at least one of the defined blocks selected by said selecting means.

6. A high speed imaging apparatus according to claim 5, further comprising:

a frame memory, connected to said picture image record memory, for storing frames of the imaged field of view to be displayed;

a digital-to-analog converter, connected to said frame memory, for converting digital image data stored in the frame memory into analog image data; and a display for displaying an image represented by the analog image data supplied by said digital-to-analog converter.

7. A high speed imaging apparatus according to claim 1, further comprising clock means for transmitting a signal driving said vertical scanning means and said horizontal scanning means.

8. A high speed imaging apparatus according to claim 1, wherein said vertical scanning means includes a vertical counter and said horizontal scanning means includes a horizontal counter.

9. A high speed imaging apparatus according to claim 1, wherein said horizontal scanning means sequentially activates each column of the photoelectric converting elements within the selected one of the defined blocks, said vertical scanning means activates all the rows of the photoelectric converting elements within the selected one of the defined blocks, and said reading means reads the parallel outputs from the photoelectric converting elements within the activated rows for each of the sequentially activated columns of the selected one of the defined blocks.

* * * * *